United States Patent Office 3,549,482
Patented Dec. 22, 1970

3,549,482
PRINTING MATERIAL AND PROCESS FOR
PRODUCING THE SAME
Tokujiro Okutani, 432 Kamitakaido 2-chome,
Suginami-ku, Tokyo, Japan
No Drawing. Continuation-in-part of application Ser. No.
577,614, Sept. 7, 1966. This application Mar. 20, 1967,
Ser. No. 624,213
Claims priority, application Japan, Sept. 14, 1965,
40/56,013
Int. Cl. B32b 27/08; C09g 3/14
U.S. Cl. 161—254  6 Claims

ABSTRACT OF THE DISCLOSURE

A resinous sheet comprising 100 parts by weight of a polymer of either vinyl chloride or vinylidine chloride in admixture with an amount of greater than 50 parts by weight of a plasticizer, one surface of said resinous sheet being adhered under pressure to the surface of a fibrous backing material. The surface of the backing material which is in contact with the resinous sheet is coated with a copolymer of vinyl chloride and vinylidine chloride, a copolymer of styrol and methyl acrylate, or a copolymer of styrol and butadiene. The opposite, unadhered surface of the resinous sheet may be printed upon.

BACKGROUND OF THE INVENTION

This is a continuation-in-part application of application Ser. No. 577,614, filed on Sept. 7, 1966 for A Printing Material and Process for Producing the Same, now abandoned.

This invention relates to a process for printing upon a material having a high degree of tackiness and stickiness and to the printed product formed thereby. More particularly, this invention relates to printing upon a resinous material having a high degree of tackiness and stickiness formed from either vinyl chloride or vinylidene chloride and to the product produced therefrom.

In providing adhering advertising labels, it is found to be best to utilize materials which have a high degree of tackiness and stickiness so that the labels formed from these materials can be readily adhered to various surfaces. Hence by use of these materials as labels, a highly tenacious bond forms between the label and the surface to which it is adhered. Furthermore, it is also a desired characteristic of advertizing labels to be formed from materials which are able to strongly adhere to various surfaces and which also can easily be removed from these surfaces without the label losing any of its tackiness so that the label can be re-used.

It has been found that films or sheets of vinyl chloride or vinylidene chloride resin containing 100 parts by weight of the vinyl or vinylidene chloride and a high amount of a plasticizer have improved stickiness and tackiness which makes these resins strongly adherable to various surfaces as well as easily removable therefrom by means of peeling without any resultant loss in their original tackiness or stickiness. However, the great disadvantage of utilizing vinyl or vinylidene chloride sheets containing a large amount of plasticizer is that it is difficult to print directly on these resin sheets. In order to overcome this problem, workers in the field have utilized vinyl or vinylidene chloride polymers having a lower plasticizer content in combination with additives, such as lubricants, and antistatic agents with a resulting loss in the tackiness and stickiness of the resin. Therefore, it has been long desired to provide a printed label from a vinyl or vinylidene chloride polymer having a high plasticizer content.

Another object of this invention is to provide a printed label from a resinous sheet containing 100 parts by weight of polyvinyl chloride or polyvinylidene chloride and an amount of greater than 50 parts by weight of a plasticizer.

Another object of this invention is to provide a method for producing a printed label from a resinous sheet containing 100 parts by weight of a polymer of either vinyl chloride or vinylidene chloride in admixture with an amount of greater than 50 parts by weight of a plasticizer.

Other objects and advantages of the invention will be apparent from the following description.

SUMMARY OF THE INVENTION

In accordance with the present invention, a resinous sheet comprising 100 parts by weight of a polymer of either vinyl chloride or vinylidene chloride in admixture with an amount of greater than 60 parts by weight of a plasticizer can be printed to form a label by adhering under pressure one surface of this resinous sheet to the surface of a fibrous backing material, said surface of said backing material being coated with a copolymer of vinyl chloride and vinylidene chloride, styrol and methyl acrylate or a copolymer of butadiene and styrol, and having a smoothness not exceeding 150 mm. Hg (value measured by "Smooster" measurer) and thereafter printing upon the opposite unadhered surface of the resinous sheet. In this manner, a printed label can be formed from a vinyl or vinylidene chloride sheet containing a high degree of plasticizer without using any binding agent for the vinyl chloride sheet or without reducing the amount of tackiness or stickiness of these vinyl chloride sheets.

After printing, the vinyl chloride sheet can be peeled off the coated backing material and re-adhered to any flat or smooth surface such as wood, glass, or metal. If desired, the printed vinyl chloride sheet can be again peeled off the smooth surface and adhered to another smooth surface without the danger of the polyvinyl chloride film losing its initial stickiness or tackiness. Furthermore, the label of this invention can be utilized in transporting a plurality of glass sheets or mirrors so as to prevent breakage of these glass sheets or mirrors during their shipment. Due to the stickiness of the surface of the resin sheet of this invention, the resin sheet can be placed and adhered between each of the glass sheets or mirrors when they are shipped. In this manner, each of the glass sheets or mirrors will be anchored by means of this resin material to the next adjacent mirror or glass sheet so as to prevent sliding or slippage during transportation.

DETAILED DESCRIPTION OF THE INVENTION

The polyvinyl or polyvinylidene chloride sheet which is utilized in accordance with this invention can be any vinyl or vinylidene chloride polymer that contains an amount greater than 50 parts by weight of plasticizer per hundred parts by weight of vinyl or vinylidene chloride. The sheet can be fabricated from polyvinyl chloride or polyvinylidene chloride by any of the conventional fabricating means such as calendering, extruding, etc. In accordance with this invention, the sheet may be in the form of a film which has a thickness not exceeding 0.5 mm. or alternatively it may be in the form of a very thick sheet. This is true, since it has been found that very thin films which have been difficult to print upon, in the past, can be easily printed with any desired configuration in accordance with this invention.

Any conventional plasticizers for vinyl chloride or vinylidene chloride can be utilized in accordance with this invention. Typical plasticizers for vinyl chloride or vinylidene chloride include phthalate esters such as di-(2-ethyl-hexyl) phthalate, normal dioctyl phthalate, esters of straight chain dibasic acid(s) such as dioctyl adipate and dioctyl sebacate, phosphate, ester(s) such as tri-cresyl phosphate and trioctyl phosphate, polymeric plasticizers such as polypropylene glycol, sebacate, polypropylene glycol adipate, etc. Any of the conventionally utilized stabilizers and lubricants can be incorporated into the polyvinyl or vinylidene chloride prior to its formation into a sheet or film.

The backing material utilized, in accordance with this invention, includes any conventional natural or synthetic fibrous backing material such as paper, wood, mats of cellulose acetate fibers or nylon fibers, etc.

The fibrous backing, in accordance with this invention, is coated on at least one side with a copolymer which may be either vinylidene chloride and vinyl chloride, styrol and methyl acrylate, or butadiene and styrol. This coating is applied so that the coated backing surface has a smoothness not exceeding 150 mm. Hg (value measured by "Smooster" measure) and preferably between about 50 mm. Hg and 120 mm. Hg. The "Smooster" measure is described in Japanese Pat. No. 188,388. It has been found that this coated surface when adhered to one of the sticky surfaces of the vinyl or vinylidene chloride resin sheet will prove a proper support for the vinyl or vinylidene chloride so that the vinyl or vinylidene chloride can be printed thereon. The vinyl or vinylidene chloride sheet can be directly adhered to the smooth sheet without the necessity of rolling or applying any usual binding agent to the vinyl or vinylidene chloride film. This is true since the stickiness of the surface of the vinyl chloride film or sheet adheres perfectly to the coated surface of the backing by means of Van der Waals forces and the polar chemical bonds. Furthermore, the adhesion between the vinyl chloride or vinylidene chloride sheet and the coated surface of the backing prevents the vinyl or vinylidene chloride sheet from exfoliating or slidnig during the process of printing. Additionally, the adhesion between the coated backing surface and the vinyl chloride or vinylidene chloride resin sheet allows this sheet to be printed by typical printing processes which place a high degree of shear on the resin due to the fact that the adhesion of the resin to the backing surface eliminates the shear to which the resin is subjected during printing. Therefore, the use of this backing makes it possible to accomplish various types of printing such as multicolored printing of the polyvinyl or polyvinylidene chloride sheets.

The polyvinyl or polyvinylidene sheets can be adhered to the coated backing material in accordance with this invention by means of pressure, thereby providing a structure which can be printed. Generally, it is preferred to apply a pressure of from about 10 kg. per cubic centimeter to the coated backing material and the sheet for a period of at least 5 minutes so that perfect adhesion is produced between the sheet and the backing. The printing step may be carried out by any conventional means generally utilized for printing vinyl chloride or vinylidene chloride surfaces. The specific method of printing and the specific ink or dye that is applied to the surface of the vinyl or vinylidene chloride film depends upon the desired configuration which is to be printed on the vinyl or vinylidene chloride sheet. When the entire surface of the vinyl or vinylidene chloride sheet is printed or coated with a printing ink, this surface loses its stickiness and tackiness and the printing ink or dye is adhered on the vinyl or vinylidene chloride film by the stickiness or tackiness of this film so that it cannot be peeled off. The printed vinyl chloride film may be cut into any desired shape while it is adhered to the backing paper. After the vinyl or vinylidene chloride sheet is peeled off from the backing paper, it does not lose its original stickiness or tackiness and it may later be adhered to smooth materials such as glass, flat coated surfaces, mirror surfaces, metal surfaces, etc. If desired, the vinyl or vinylidene chloride film may again be peeled off from these surfaces and transferred and adhered to a different surface without any loss of its original stickiness or tackiness.

The following examples are intended to illustrate the present invention without limiting, however, the scope thereof.

EXAMPLE I

A sheet is prepared from a vinyl chloride resin formulation of the following ingredients:

| Components: | Parts by weight |
|---|---|
| Polyvinyl chloride (having a molecular weight of about 81,000) | 100 |
| Di-(2-ethyl-hexyl)-phthalate | 60 |
| Dioctyl sebacate | 5 |
| Dibutyl tin dilaurate | 2 |
| Cadmium stearate | 0.3 |
| Barium stearate | 0.2 |
| Stearic acid | 0.2 |

The sheet produced from this formulation was a transparent soft film with a thickness of 0.25 mm. This film was adhered to a surface of a paper sheet by means of applying a pressure of 20 kg. per cm.³ for a period of 5 minutes at room temperature by means of a hydraulic press. The surface of the paper to which the film was adhered was coated with a vinylidene chloride and vinyl chloride copolymer prior to it being adhered to the film. The vinyl chloride vinylidene chloride copolymer consisted of from about 5 parts by weight of a vinyl chloride and 95 parts by weight of vinylidene chloride. The coated surface of the paper had a smoothness of 100 mm. Hg (according to "Smooster" measure) and an air permeability of ten minutes (according to JISP 8117 (1960)). The coating was approximately 0.1 mm. thick. While the film was adhered to the paper, the film was printed by means of five color offset printing to produce a printed label containing the desired printed configuration.

EXAMPLE II

A vinyl chloride sheet was prepared from the following vinyl chloride resin formulation:

| Components: | Parts by weight |
|---|---|
| Polyvinyl chloride (a molecular weight of 69,000) | 100 |
| Di-(2-ethyl-hexyl) phthalate | 55 |
| Dioctyl adipate | 5 |
| Dibutyl tin dilaurate | 2 |
| Cadmium stearate | 0.3 |
| Barium stearate | 0.2 |
| Stearic acid | 0.3 |

The sheet produced from the above formulation was a transparent soft film having a thickness of 0.15 mm. The film was adhered to the coated surface of paper by means of applying a pressure of 10 kg. per cm.³ for a period of 5 minutes at room temperature. The surface of the paper to which the film was applied was coated with a copolymer of styrene and methyl acrylate. The copolymer consisted of 15% by weight of styrene and 85% by weight of methyl acrylate. The paper was coated with the copolymer so that the copolymer coating had a thickness of 0.1 mm. The paper had a smoothness of 90 mm. Hg (according to "Smooster" measure) and an air permeability of ten minutes. The film having the paper adhered thereon was printed by means of a three-color leaf press printing so that a printed lebal was formed. When the paper was removed from one of the surfaces of the film, this surface was sticky and tacky and could tenaciously adhere to the surfaces of various materials such as metal, glass, etc.

While specific embodiments of the invention have been shown and described in detail to illustrate the application of the inventive principles, it will be understood that the invention may be embodied otherwise without departing from such principles.

What is claimed is:

1. Sheet material adapted to be printed, comprising a normally tacky resinous film comprising two oppositely disposed surfaces, namely, a first surface being adapted to receive printed matter and a second surface adhered to a backing material, said film comprising 100 parts by weight of a polymer selected from the group consisting of polymeric vinyl chloride and polymeric vinylidene chloride and an amount greater than 50 parts by weight of a plasticizer for said polymer, said second surface of said resinous film being adhered to the coated surface of a fibrous backing material, said coated surface of said backing material being formed of a copolymer selected from the group consisting of copolymers of butadiene and styrol, copolymers of styrol and methyl acrylate and copolymers of vinylidene chloride and vinyl chloride, said coated backing material lacking substantial amounts of plasticizer.

2. The material of claim 1, wherein said backing material is paper coated with a vinylidene chloride-vinyl chloride copolymer.

3. A process for printing upon a resinous sheet having a high degree of tackiness comprising:
    (a) providing a resinous sheet having tacky oppositely disposed surfaces and containing 100 parts by weight of a copolymer selected from the group consisting of vinyl chloride and vinylidene chloride and an amount greater than 50 parts by weight of a plasticizer;
    (b) adhering under pressure one surface of said resinous sheet to a surface of a backing material, wherein said backing surface is coated with a material being essentially devoid of plastizer and being selected from the group consisting of vinylidene chloride-vinyl chloride copolymers, styrol-methyl acrylate copolymers, butadiene-styrol copolymers, and printing on the surface of said resinous sheet oppositely disposed to said adhered surface.

4. The process of claim 3, wherein said resinous sheet is adhered to said backing material under a pressure of from about 20 kg. per cm.$^3$ to 10 kg. per cm.$^3$.

5. The process of claim 3, wherein said backing material is paper.

6. The process of claim 3, wherein the coated backing is removed and the thus released surface of the resinous sheet can be self-adhered to any appropriate surface.

References Cited
UNITED STATES PATENTS

| | | | |
|---|---|---|---|
| 2,567,067 | 9/1951 | Grupp et al. | 117—3.6 |
| 2,940,196 | 6/1960 | Schor | 161—406X |
| 3,192,100 | 6/1965 | Morgan | 161—406X |
| 3,334,009 | 8/1966 | Questel et al. | 161—245 |

JOHN T. GOOLKASIAN, Primary Examiner

C. B. COSBY, Assistant Examiner

U.S. Cl. X.R.

156—240, 308